H. K. PARSONS AND H. H. STYLL.
ELECTRIC SOLDERING.
APPLICATION FILED SEPT. 30, 1919.
1,340,736.
Patented May 18, 1920.
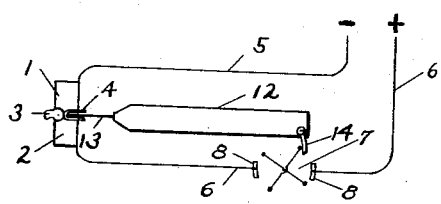
FIG. I
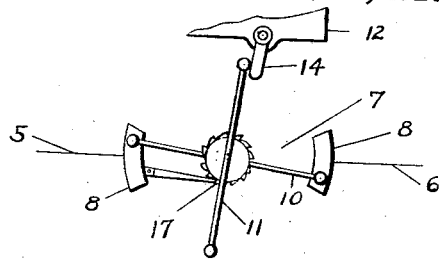
FIG. II
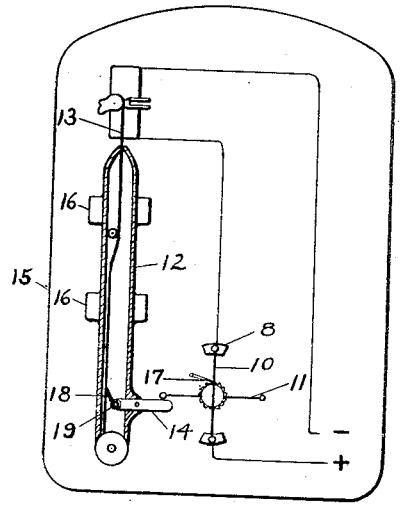
FIG. III
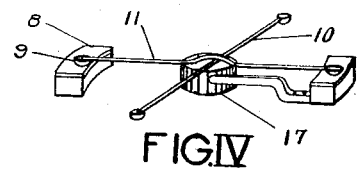
FIG. IV
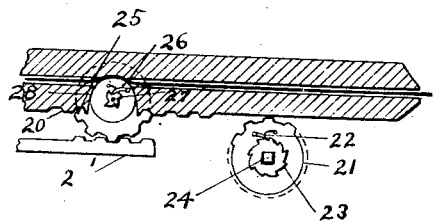
FIG. V
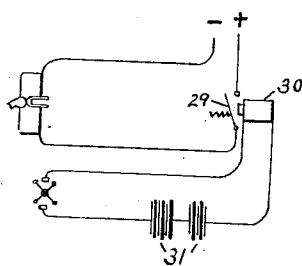
FIG. VI
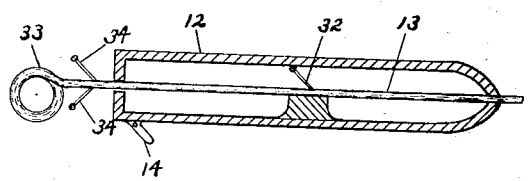
FIG. VII
INVENTORS
Harry H. Styll.
H. K. Parsons.

UNITED STATES PATENT OFFICE.

HAROLD K. PARSONS AND HARRY H. STYLL, OF SOUTHBRIDGE, MASSACHUSETTS.

ELECTRIC SOLDERING.

1,340,736.  Specification of Letters Patent.  Patented May 18, 1920.

Application filed September 30, 1919. Serial No. 327,562.

*To all whom it may concern:*

Be it known that we, HAROLD K. PARSONS and HARRY H. STYLL, citizens of the United States, residing at Southbridge, in the county of Worcester and State of Massachusetts, have invented certain new and useful Improvements in Electric Soldering, of which the following is a specification.

This invention relates to improvements in electric soldering apparatus and has particular reference to an improved construction of automatic controls for such apparatus.

In performing the operation of electric soldering, welding, or the like, particularly in connection with small articles, considerable care must be used both to prevent overheating of the work and undue deposit of solder on the work, and it is also essential that the heating current be broken at some point foreign to the work to prevent damaging of the work by the arc resulting from the breaking of the circuit.

It is, therefore, one of the principal objects of our present invention to provide a novel and improved apparatus which will take care of the difficulties hitherto experienced and render the uniting of the parts substantially automatic once the machine has been adjusted, enabling relatively unskilled operators to satisfactorily perform the soldering operation in place of requiring extreme skill and knowledge of soldering or welding in order to properly unite the parts.

A further object of the present invention is the provision of novel and improved means for automatically providing a requisite amount of solder at each operation so that the product shall be most uniform and waste of precious metal, solder, or the like, obviated.

Other objects and advantages of our improved apparatus should be readily apparent by reference to the following specification taken in connection with the accompanying drawings, and it will be understood that we may make any modifications in the specific details of construction shown and described within the scope of the appended claims without departing from or exceeding the spirit of our invention.

Figure I represents a diagrammatic view illustrating our apparatus.

Fig. II represents a fragmentary diagrammatic view illustrating the switch operation.

Fig. III represents a semi-diagrammatic plan view with parts in section to illustrate mechanical features.

Fig. IV represents a detail view in elevation of one form of switch mechanism.

Fig. V represents an enlarged detail sectional view of a slightly modified form of solder holder and associated parts.

Fig. VI represents a diagrammatic view of a slightly different type of wiring embodying our invention.

Fig. VII represents a detail view of another form of holder.

In the drawings, the numerals 1 and 2 designate the work holding jaws which are preferably of suitable form to securely retain the particular articles to be operated upon, in the present instance these jaws being shown as retaining the bridge 3 and lens clip 4 which are to be united. The numeral 5 has been employed to designate the negative, and the numeral 6 the positive wires of the heating circuit, which may be of any desired form, the current being supplied either from a transformer, generator, storage battery, or the like, and for convenience being termed a heating circuit, irrespective of the manner in which the current supply is obtained. It will be understood in connection with the foregoing that the current passing from the jaw 2 through the work to the jaw 1 and thence to the return wire 5 will raise the temperature of the interposed parts 3 and 4 the desired amount for the soldering or welding operation to be performed, and that in performance of the work it is desirable that the heating effect occur only while the work is clamped between the jaws and for a sufficient period to produce the desired temperature to effect the result with the heat discontinued as quickly as possible thereafter to avoid undue heating or damaging of the parts. Furthermore, when the current is to be discontinued it is practically essential that the break in the circuit be at some point foreign to the work in order that there may be no spark or arc to injure the goods, this being particularly required in the case of small articles, such as parts of ophthalmic mountings, in which the arc might destroy the finish of the goods.

To accomplish this result we, therefore, have the circuit normally open at the point 7, the ends of the wires here being provided with the spring contact fingers 8 of usual construction, as illustrated in connection with Fig. IV, these fingers being adapted to be engaged by the contact points 9 on the arms 10 and 11, there preferably being two pairs of arms disposed at right angles to each other and suitably insulated one from the other so that the current may pass through either pair of arms which may be in engagement with the fingers 8, thus closing the circuit, but no current passing through the free arms.

Referring particularly to Fig. I, it will be noted that we have here illustrated the solder holder 12 having projecting therefrom the solder 13 to be applied to the work, this holder being further provided with the finger 14 adapted to engage the switch arms 10 and 11 to operate the switch. In operation, as will be understood by reference to Figs. I and II, it is merely necessary to move the solder holder 12 forward in the direction of the work, when the finger 14 will engage one of the arms 10 or 11 rotating the switch to bring the contacts 9 of the opposite pair of arms into engagement with the contact fingers 8, thus closing the circuit through the line 6. The length of time that the circuit will remain closed, is, of course, dependent on the speed of movement of the holder 12 but the parts are ordinarily so calculated that the circuit will be just closed as the projecting end 13 of the solder comes into engagement with the work, the solder being held toward the work until the work is sufficiently heated by the current to properly hold the solder, when this melting will allow a further forward progressive movement of the holder 12, which through its finger 14 will rotate the switch breaking the heating circuit as the operation is completed, the switch being thus indirectly controlled by the melting of the solder, in that the progressive movement necessary to shut off the heating current does not occur until after the solder is melted but will automatically occur at this point due to the continued pressure exerted either manually or automatically against the solder holder. The solder holder may then be withdrawn, the work changed, and the operation repeated, the opposite switch arms now completing the circuit, while the pressure of the finger 14 is applied to one of the arms which was previously operating to close the circuit. In this manner the switch is a continuous progressively operating one serving automatically to control the heating of the parts to be united.

Referring more particularly to the specific details of construction illustrated in connection with Fig. III, it will be noted that we have there provided on the support 15 the guides 16 for the solder holder 12, and have also mounted on said support 15 the switch member comprising the arms 10 and 11 and the contact fingers 8, while for operating the switch we have shown pivoted to the solder holder 12 the finger 14 which will thus press against the projecting one of the arms 10 or 11 to control the switch, as just noted, but being pivoted to slide freely back over the upstanding switch arm on reverse movement, a suitable friction device or ratchet as at 17 being provided to prevent operation of the switch on the return movement of the solder holder.

We have shown the finger 14 as projecting interiorly of the solder holder and terminating in the resilient solder feed finger 18 pivoted to the member 14 and actuated as by the spring 19 so that as the finger 14 is rocked backward through contact with the upstanding switch arm on its reverse movement the member 18 will slide backward on the solder gripping the solder at a rearward position from that previously occupied, while on return movement the engagement between the operating finger 14 and switch arm will have sufficient force to cause the member 18 to automatically feed forward a proper length portion of solder before the holder has advanced to operative position. It will thus be seen that we both automatically control the supply of solder for the work and the current for melting the solder.

A different form of solder holder and operative connections is illustrated in connection with Fig. V, in which the solder holder is shown as provided on its under surface with the rack portion 20 adapted to engage the pinion 21, which is provided with the spring pressed pawl 22 engaging the ratchet 23 on the squared shaft 24 which is suitably connected with the hub of the switch so that forward movement will rotate the pinion 21 and thus the shaft 24 and switch, while on reverse movement the pawl will ride idly over the ratchet 23. At the same time we provide on the support 15 the longitudinally adjustable rack 24' meshing with the pinion 25, which through the pawl 26 and ratchet 27 operates the solder feed roll 28 on forward movement without disturbing the solder on the rear movement. We thus secure absolute positive drive for the switch and solder feed in this form of construction which is then particularly adapted for use only when rigid drives for the solder are employed, but cannot be so satisfactorily used when the solder is manually used, as is possible with the features shown in Figs. I and II. The longitudinal adjustment of the rack 24 serves to control the amount of solder which will be fed forward at a movement of the holder.

While in Fig. I for example we have shown the control switch as disposed in the main or heating circuit, it will be understood that if preferred an ordinary simple switch 29 may be interposed in the heating circuit controlled as by the electromagnet 30 securing this current from a suitable source of supply, either from the main line or from the batteries 31, the control switch in this instance being placed in the supplemental circuit which through the magnet 30 serves to operate the heating circuit switch 29, the method of operation in either event, however, being the same.

In Fig. VII, we have shown a simplified form of holder embodying the casing 12, through which slides the solder 13, which is grippingly engaged by the finger 32 as the holder is moved forward, the finger 32 sliding freely over the solder, however, on reverse movement, the solder being fed off the reel 33 and being held adjacent the holder against backing up movement by the fingers 34, the action being that as the holder moves forward the solder is fed off the reel forward through the fingers 34 which allow it to slide by, being dragged in this direction by interlocking engagement of the finger 32 with the solder in the holder, while on reverse movement the fingers 34 hold the solder which slides freely under the finger 32 until the finger 32 reaches its rearmost position, when a new supply of solder will be held projecting from the forward end of the holder

We claim:

1. Electric soldering apparatus including a heating circuit, a progressive on and off switch for controlling the flow of current through said circuit, and means for automatically operating said switch.

2. Apparatus for the purpose described including work holding jaws, a heating circuit for raising the temperature of the work when between the jaws, a progressive switch for controlling the flow of current, a solder holder and operative connections between the solder holder and switch for actuating the latter.

3. Apparatus of the character described including a heating circuit and a controlling switch therefor, a solder holder adapted to be progressed toward the work, and connections between the holder and switch for progressively operating the latter to first energize and then break the heating circuit as the holder is advanced in the direction of the work.

4. A device of the character described including a heating circuit and a solder holder, and means for automatically energizing and breaking the heating circuit as the solder holder is advanced toward the work.

5. A device of the character described including a heating circuit and a solder holder, means for automatically energizing and breaking the heating circuit as the solder holder is advanced toward the work, and means for automatically feeding the solder from the holder.

6. Apparatus for electrically soldering or welding, including means for holding the parts to be united, and a holder for a uniting medium, a heating circuit, including the parts to be united, a progressively operable switch for controlling the energization of the heating circuit and inter-engaging members on the switch and holder for progressively operating the switch as the holder is moved toward the parts to be united.

7. Apparatus for electrically soldering or welding, including means for holding the parts to be united, and a holder for a uniting medium, a heating circuit, including the parts to be united, a progressively operable switch for controlling the energization of the heating circuit, inter-engaging members on the switch and holder for progressively operating the switch as the holder is moved toward the parts to be united, the uniting medium limiting the movement of the holder in the direction of the parts to be united.

8. In apparatus for electrically uniting materials, a holder for the uniting medium, a feed member in the holder, and means for automatically projecting a portion of the material as the holder is shifted in one direction.

9. Electric soldering apparatus including a work holder, a solder holder and a progressively operable switch for controlling the work, and connections between the solder holder and the switch for closing the switch as the holder is primarily advanced toward the work, and for opening the switch as the holder is subsequently advanced upon melting of the solder.

10. Electric soldering apparatus including a heating circuit, a solder holder, means for automatically projecting a predetermined portion of solder from the holder, a switch for controlling the heating circuit, and means connecting the holder and switch to close the switch as the projected portion of solder is brought into engagement with the work, and to open the switch as the holder progressively advances upon melting of the solder.

11. Electric soldering apparatus including a work holder, a heating circuit, a progressive switch controlling the heating circuit, a reciprocable solder holder, and connections for progressively operating the switch upon movement of the solder holder in direction of the work.

12. Electric soldering apparatus including a work holder, a heating circuit, a progressive switch controlling the heating circuit, a reciprocable solder holder, connections for progressively operating the switch upon movement of the solder holder in direction of the work, and means for rendering the operating means inoperative upon reverse movement of the solder holder.

13. Apparatus of the character described including a reciprocable solder holder and a control switch, means for projecting a predetermined amount of solder from the holder upon movement thereof in one direction, and connections between the holder and switch for progressively operating the latter upon movement of the holder toward the work.

In testimony whereof we have affixed our signatures, in presence of two witnesses.

HAROLD K. PARSONS.
HARRY H. STYLL.

Witnesses:
   Esther M. Lafler,
   Alice G. Haskell.